United States Patent
Mammolenti et al.

(10) Patent No.: US 12,257,731 B2
(45) Date of Patent: Mar. 25, 2025

(54) CLUTCH ASSEMBLY FOR HANDLING A CONTAINER

(71) Applicant: BELVAC PRODUCTION MACHINERY, INC., Lynchburg, VA (US)

(72) Inventors: David Joseph Mammolenti, Moneta, VA (US); Syed Ali Asghar, Richmond, TX (US); Harold James Marshall, Forest, VA (US); Robert Charles Graefe, Jr., Lynchburg, VA (US)

(73) Assignee: BELVAC PRODUCTION MACHINERY, INC., Lynchburg, VA (US)

( * ) Notice: Subject to any disclaimer, the term of this patent is extended or adjusted under 35 U.S.C. 154(b) by 557 days.

(21) Appl. No.: 17/616,827

(22) PCT Filed: Jun. 3, 2020

(86) PCT No.: PCT/US2020/035974
§ 371 (c)(1),
(2) Date: Dec. 6, 2021

(87) PCT Pub. No.: WO2020/247534
PCT Pub. Date: Dec. 10, 2020

(65) Prior Publication Data
US 2022/0305688 A1  Sep. 29, 2022

Related U.S. Application Data

(60) Provisional application No. 62/857,996, filed on Jun. 6, 2019.

(51) Int. Cl.
*B26D 7/02* (2006.01)
*B65G 47/86* (2006.01)
*B66C 1/54* (2006.01)

(52) U.S. Cl.
CPC ............. *B26D 7/02* (2013.01); *B65G 47/847* (2013.01); *B66C 1/54* (2013.01)

(58) Field of Classification Search
CPC ........ B26D 7/02; B65G 47/847; B65G 47/90; B66C 1/54; B29C 49/72; B29C 49/42826;
(Continued)

(56) References Cited

U.S. PATENT DOCUMENTS 4,199,183 A * 4/1980 Hecker ...................... B66C 1/54
414/416.06
4,340,249 A * 7/1982 Bucklew ................ B65G 47/90
294/95

(Continued)

FOREIGN PATENT DOCUMENTS

CN   204449956 U   7/2015
CN   109591166 A   4/2019
(Continued)

OTHER PUBLICATIONS

International Search Report and Written Opinion in International Application No. PCT/US2020/035974, mailed Sep. 18, 2020 (13 pages).

*Primary Examiner* — Stephen A Vu
(74) *Attorney, Agent, or Firm* — NIXON PEABODY LLP

(57) ABSTRACT

Aspects of the disclosure relate to a clutch assembly (100) for handling a container, and an associated method for using the clutch assembly. The clutch assembly includes a shaft (102) configured to rotate in a first direction and a second direction, opposite from the first direction. The clutch assembly further includes a clutch coupled to a first end of the shaft. The clutch includes at least two rollers (108) configured to move into a first position, extending radially beyond a periphery of the clutch, and out of the first position, extending radially flush with or inward from the periphery of the clutch.

17 Claims, 11 Drawing Sheets

(58) Field of Classification Search
CPC ........ B29C 49/42069; B29C 49/42085; B29C 49/4278; F16D 41/066; B23Q 3/12; B23Q 1/25
See application file for complete search history.

(56) References Cited

U.S. PATENT DOCUMENTS

| | | | | |
|---|---|---|---|---|
| 4,572,710 A | * | 2/1986 | Stock | G21C 19/207 |
| | | | | 414/164 |
| 5,017,330 A | * | 5/1991 | Hurdiel | G21C 19/30 |
| | | | | 976/DIG. 266 |
| 5,156,246 A | * | 10/1992 | Iga | F16D 41/067 |
| | | | | 192/41 R |
| 5,379,330 A | | 1/1995 | Lovell | |
| 8,402,870 B1 | * | 3/2013 | Marquette | B23D 15/002 |
| | | | | 83/284 |
| 9,885,393 B2 | * | 2/2018 | Mori | F16C 33/485 |
| 2017/0282438 A1 | * | 10/2017 | Morin | B29C 49/6463 |

FOREIGN PATENT DOCUMENTS

| | | |
|---|---|---|
| CN | 210549559 U | 5/2020 |
| DE | 966553 C | 8/1957 |
| DE | 102012106245 A1 | 2/2014 |
| JP | H02-132071 U | 11/1990 |
| JP | H07-27787 U | 5/1995 |
| JP | 2017-094429 A | 6/2017 |

\* cited by examiner

CLUTCH ASSEMBLY FOR HANDLING A CONTAINER

CROSS-REFERENCE TO RELATED APPLICATION

This application is a U.S. National Stage entry of International Application No. PCT/US2020/035974, filed Jun. 3, 2020, which claims benefit of and priority to U.S. Provisional Patent Application Ser. No. 62/857,996, filed on Jun. 6, 2019, each of which is hereby incorporated by reference herein in its entirety.

FIELD

The present disclosure relates generally to the field of equipment for container processing systems. More specifically, the present disclosure relates to a clutch that grips the open ends of containers.

BACKGROUND

Machine lines for container manufacturing generally have multiple machine arrangements that perform the various processing steps during formation of the containers. The machine arrangements have various different gripping devices or systems for gripping the containers. For example, the arrangements have cups, belts, or toothed rotation jaws that engage the containers. However, these current gripping devices or systems have the potential for slippage and/or can create dust (e.g., small particles of the container) that can interfere with subsequent processing steps.

It would be desirable to have a better way to grip the containers that reduces or eliminates the slippage, the dust, or both, among solving other issues associated with conventional gripping devices and systems.

SUMMARY

One exemplary embodiment of the disclosure relates to a clutch assembly for handling a container having an opening. The clutch assembly includes a shaft configured to rotate in a first direction and a second direction, opposite from the first direction. The clutch assembly also includes a clutch at a first end of the shaft configured to at least partially fit within the opening of the container. The clutch includes a cam having at least two cam surfaces and at least two rollers. Each roller of the at least two rollers is configured to (i) engage against an inner surface of the opening of the container and a cam surface of the at least two cam surfaces when the shaft rotates in the first direction, and (ii) disengage from against the inner surface of the opening of the container and the cam surface when the shaft rotates in the second direction.

Another exemplary embodiment of the disclosure relates to a clutch assembly for handling a container. The clutch assembly includes a shaft configured to rotate in a first direction and a second direction, opposite from the first direction. The clutch assembly further includes a clutch coupled to a first end of the shaft. The clutch includes at least two rollers configured to move into a first position, extending radially beyond a periphery of the clutch, and out of the first position, extending radially flush with or inward from the periphery of the clutch.

Another exemplary embodiment of the disclosure provides a spindle shaft assembly for handling a container. The spindle shaft assembly includes a rotary ball spline and a clutch assembly connected to the rotary ball spline. The clutch assembly includes a shaft configured, based on the rotary ball spline, to translate and to rotate. The clutch assembly also includes a clutch coupled to first end of the shaft. The clutch is configured to at least partially fit within an opening of a container. The clutch includes a cam having at least two cam surfaces and at least two rollers. Each roller of the at least two rollers is configured to (i) engage against an inner surface of the opening of the container and a cam surface of the at least two cam surfaces when the shaft rotates in the first direction, and (ii) disengage from against the inner surface of the opening of the container and the cam surface when the shaft rotates in the second direction. The spindle shaft assembly further includes a first drive mechanism configured to translate the clutch assembly and a second drive mechanism configured to rotate the clutch assembly.

Another exemplary embodiment of the disclosure provides a machine arrangement having a support plate configured to rotate. The support plate includes at least one spindle shaft assembly coupled thereto. The at last one spindle shaft assembly is configured to handle a container and includes a rotary ball spline; a clutch assembly connected to the rotary ball spline that is configured to translate and rotate; a first drive mechanism configured to impart translational motion to the clutch assembly; and a second drive mechanism configured to impart rotational motion to the clutch assembly. The machine arrangement further includes a reverse rotation plate configured to contact the second drive mechanism to impart the rotational motion to the second drive mechanism in a first direction, and a stationary belt configured to contact the second drive mechanism to impart the rotational motion to the second drive mechanism in a second direction, opposite from the first direction.

Another exemplary embodiment of the disclosure includes a method of trimming a container. The method includes inserting a clutch at least partially into an opening of the container. The clutch has at least two rollers and a cam having at least two cam surfaces. Each roller of the at least two rollers corresponds with a respective cam surface of the at least two cam surfaces. The method further includes rotating the clutch in a first direction to cause the at least two rollers to engage an inner surface of the opening of the container and the at least two cam surfaces. The method further includes trimming the container by applying at least one cutting device against the container, with the container engaged with the at least two rollers and rotating with the clutch. The method further includes, upon completion of the trimming, rotating the clutch in a second direction, generally opposite from the first direction, to cause the at least two rollers to disengage from the inner surface of the opening the container. The method further includes withdrawing the clutch from the opening of the container.

It is to be understood that both the foregoing general description and the following detailed description are exemplary and explanatory only and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

Figure 1A:
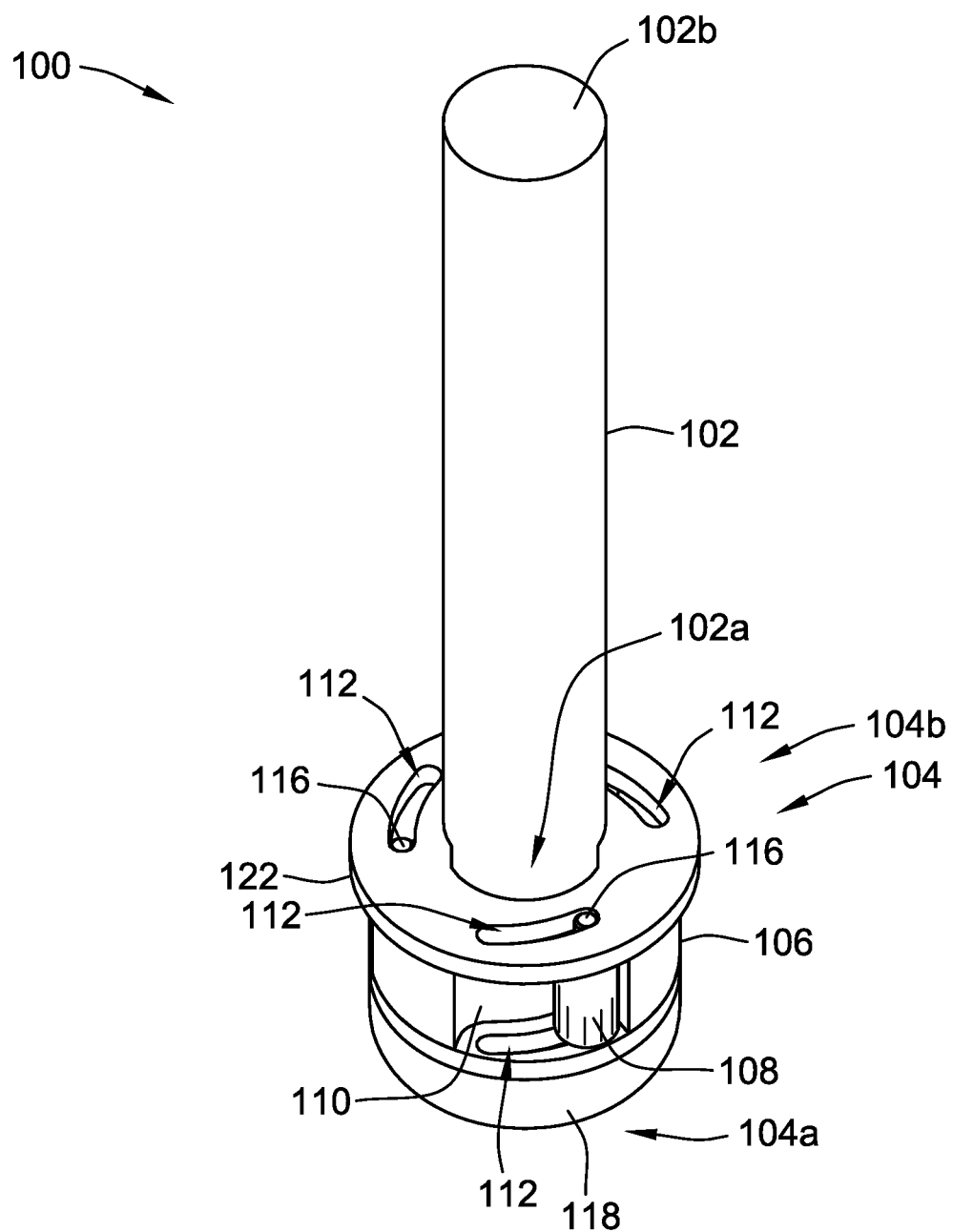
FIG. 1A is a schematic view of a device for gripping a container, according to an embodiment of the present disclosure.

While the invention is susceptible to various modifications and alternative forms, a specific embodiment thereof has been shown by way of example in the drawings and will herein be described in detail. It should be understood, however, that it is not intended to limit the invention to the particular forms disclosed, but, on the contrary, the intention is to cover all modifications, equivalents, and alternatives falling within the spirit and scope of the invention.

DETAILED DESCRIPTION

Machine arrangements are required to handle containers, such as a can, a jar, a bottle, a food or beverage container, any other similar article, or the like during various processing steps. The containers generally have an open end, an opposing closed end, and a sidewall extending from the open end to the closed end. Alternatively, the containers may be open at both ends. The present disclosure provides a clutch assembly configured to handle the containers. The clutch assembly reduces or eliminates slippage with the container and/or the creation of dust experienced by conventional devices that handle containers.

The clutch assembly includes a clutch at one end of a shaft. The clutch can be inserted at least partially into an opening at a first end of a container. The clutch includes cam-actuated rollers that engage an internal surface of the opening of the container as the clutch rotates. Subsequent processing on the container can then occur. For example, a plastic container can be rotated by the clutch during the trimming of excess plastic material and/or removing domes, as just one example. The shaft and the clutch can be driven (e.g., rotated) by a system that handles containers during processing.

Although the below-described embodiments focus on the removal of excess plastic from a plastic container, the present clutch assembly can have various other applications, such as any application that requires handling a container with a cylindrical or similar opening. The clutch assembly described herein may also be used for handling containers made of other materials including, but not limited to, metal.

Figure 1B:
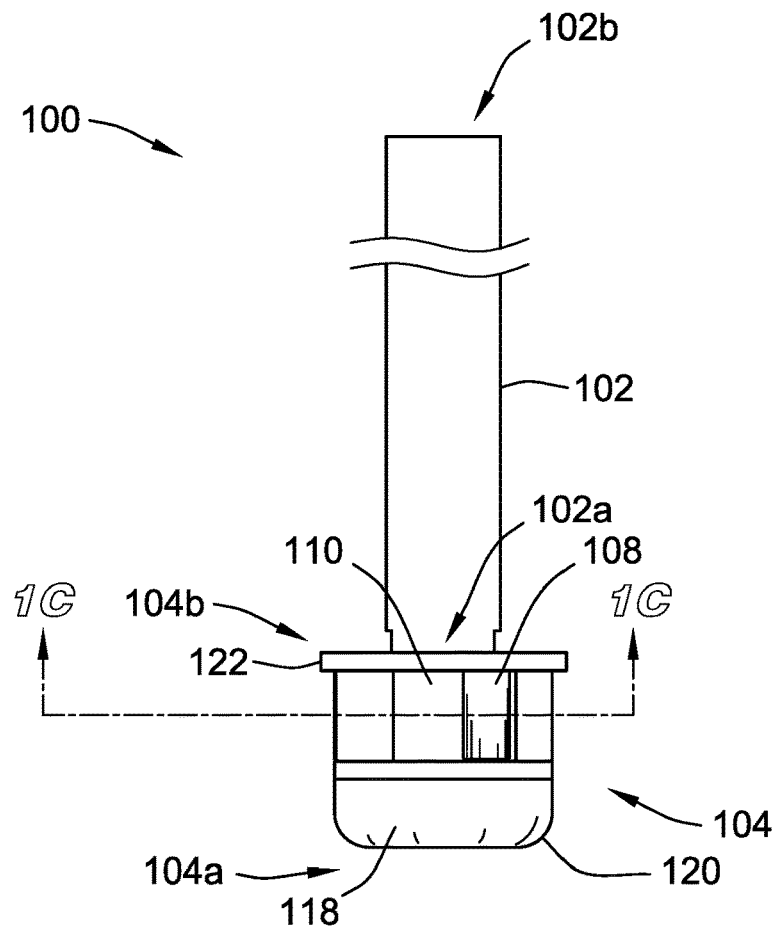
FIG. 1B is a side view of the device of FIG. 1A, according to an embodiment of the present disclosure.

Referring to FIGS. 1A and 1B, a schematic view and a side view, respectively, are shown of a clutch assembly 100 for gripping a container, according to an embodiment of the present disclosure. The clutch assembly 100 includes a shaft 102 having a first end 102a and a generally opposing second end 102b. The shaft 102 can be formed of any material conventionally used for machine arrangements, such as steel, aluminum, another metal, combinations thereof, and the like. Although shown as being cylindrical with a generally circular cross-section, the shaft 102 alternatively can have various other shapes and cross-sections, such as a triangular, square, rectangular, etc. The shaft 102 connects the clutch assembly 100 to a machine arrangement at the second end 102b, as further discussed below in FIGS. 3-4E.

Connected to the first end 102a of the shaft 102 is a clutch 104. The clutch 104 is configured by its size and shape to be inserted into the open end of a container (discussed below). The cross-sectional profile of the clutch 104 is generally the same as the opening of the container with which it is to be used (e.g., circular). However, the clutch 104 can have various other suitable profiles without departing from the scope of the present disclosure.

The clutch 104 includes a cam 106, a plurality of clutch rollers 108 that interface with the cam 106 at a plurality of cam surfaces 110, and a plurality of slots 112. In one or more embodiments, the cam 106 can be formed of any material conventionally used for machine arrangements, such as steel, aluminum, another metal, combinations thereof, and the like. In one or more alternative embodiments, the cam 106 can be formed of one or more elastic materials, such as rubber, to assist in gripping a container, as discussed below. In one or more embodiments, the cam 106 can be formed of one or more non-elastic materials, such as steel, and the cam surfaces 110 can be formed of one or more elastic materials, such as rubber. For example, the cam surfaces 110 can be one or more inserts that are affixed to the cam 106.

The rollers 108 can be formed of any material conventionally used for machine arrangements, such as steel, aluminum, another metal, combinations thereof, and the like. In one or more alternative embodiments, the rollers 108 alternatively can be formed of an elastic material, such as rubber, to assist in gripping a container, as discussed below. The rollers 108 are generally vertically arranged and sit within and between the slots 112. The rollers 108 are guided by and configured to roll along and between the slots 112. Pins 116 extend from the tops and bottoms of the rollers 108 and fit within the slots 112. The pins 116 assist in guiding the rollers 108 as the rollers 108 move within the slots 112. Corresponding rollers 108, cam surfaces 110, and slots 112 can be generally uniformly spaced around the clutch 104.

In one or more embodiments, a first end 104a of the clutch 104 includes a pilot 118. The pilot 118 assists in inserting the clutch 104 into the container opening. The pilot 118 includes an edge 120 (FIG. 1B) that can contact the container and guide the container and/or the clutch 104 into the correct alignment for inserting the clutch 104 into the container opening. The edge 120 can be generally rounded, chamfered, tapered, or include any other geometry or profile that assists in aligning the clutch 104 with the container.

In one or more embodiments, the clutch 104 can include a lip 122 at a second end 104b, generally opposite from the first end 104a. The lip 122 can contact the open edge of a container within which the clutch 104 is inserted. The lip 122 therefore prevents or inhibits the clutch 104 from being inserted too far into the container, such as beyond a point at which the rollers 108 can engage an inner diameter of the container opening.

Figure 1C:
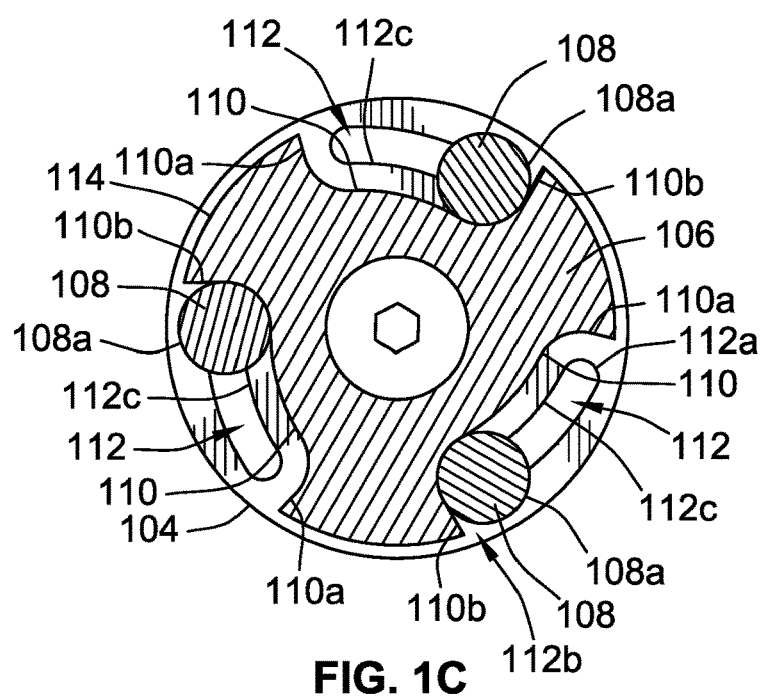
FIG. 1C is cross-sectional view along the line 1C-1C of FIG. 1B, according to an embodiment of the present disclosure.

Referring to FIG. 1C, illustrated is a cross-sectional view of the clutch 104 along the line 1C-1C of FIG. 1B, according to an embodiment disclosed herein. The slots 112 are configured relative to the periphery 114 of the clutch 104 adjacent to the rollers 108 so that the edges 108a of the rollers 108 extend beyond the periphery 114 at a first end 112a of the slots 112 and do not extend beyond the periphery 114 at a second end 112b of the slots 112. This configuration causes the rollers 108 to contact an inner surface of an opening of a container when the roller 108 are positioned towards the first end 112a of the slots 112 and to permit insertion of the clutch 104 into the opening of the container when the rollers 108 are positioned towards the second end 112b of the slots 112. The cam surfaces 110 have configurations corresponding with those of the slots 112 so that the rollers 108 contact against the cam surfaces 110 as the rollers 108 travel along the lengths of the slots 112. In one or more alternative embodiments, the cam surfaces 110 can be arranged relative to the slots 112 so that the rollers 108 contact against the cam surfaces 110 along only a portion of the slots 112. Specifically, in one example, the cam surfaces 110 can be positioned generally radially and arranged relative to the slots 112 so that the rollers 108 contact against the cam surfaces 110 where the slots 112 approach the periphery 114 of the clutch 104.

Although three sets of the rollers 108, cam surfaces 110, and slots 112 are shown in FIG. 1C, the clutch 104 can have more or less than three sets. For example, the clutch 104 can have two, four, five, six, or more sets of the rollers 108, cam surfaces 110, and slots 112, depending on the size of the container opening and/or other properties of the container. Some applications of the clutch 104 have more sets of the rollers 108, cam surfaces 110, and slots 112 if, for example, greater gripping strength is required and/or more gripping contact between the rollers 108 and the inner surface of the opening is required.

The clutch 104 of FIG. 1C is configured as an internal drive clutch. As an internal drive clutch, the cam surfaces 110 are generally radially inward of the rollers 108, and an inner surface of an opening of a container is radially outward relative to the rollers 108. In one or more embodiments, the clutch 104 can alternatively be configured as an external drive clutch. As an external drive clutch, the rollers 108 can instead contact the outer surface of the opening of the container. In such an embodiment, the outer surface of the opening of the container is radially inward relative to the rollers 108, and the cam surfaces 110 are radially outward of the rollers 108.

In one or more embodiments, the plurality of cam surfaces 110 and the plurality of slots 112 can be combined such that the plurality of slots 112 are configured to also act as the plurality of cam surfaces 110. For example, the radially interior surfaces 112c of the slots 112 can also act as the plurality of cams surfaces 110. In which case, the plurality of cam surfaces 110 can be omitted.

In one or more embodiments, the plurality of slots 112 can instead be a pair of continuous slots 112 that extend around the clutch 104. For example, there may be one continuous bottom slot 112 and one continuous top slot 112 on opposite sides of the rollers 108. In which case, the travel distance of the rollers 108 can be limited by the cam surfaces 110 rather than by each of the first and second ends 112a and 112b, respectively, of the slots 112.

Figure 2A:
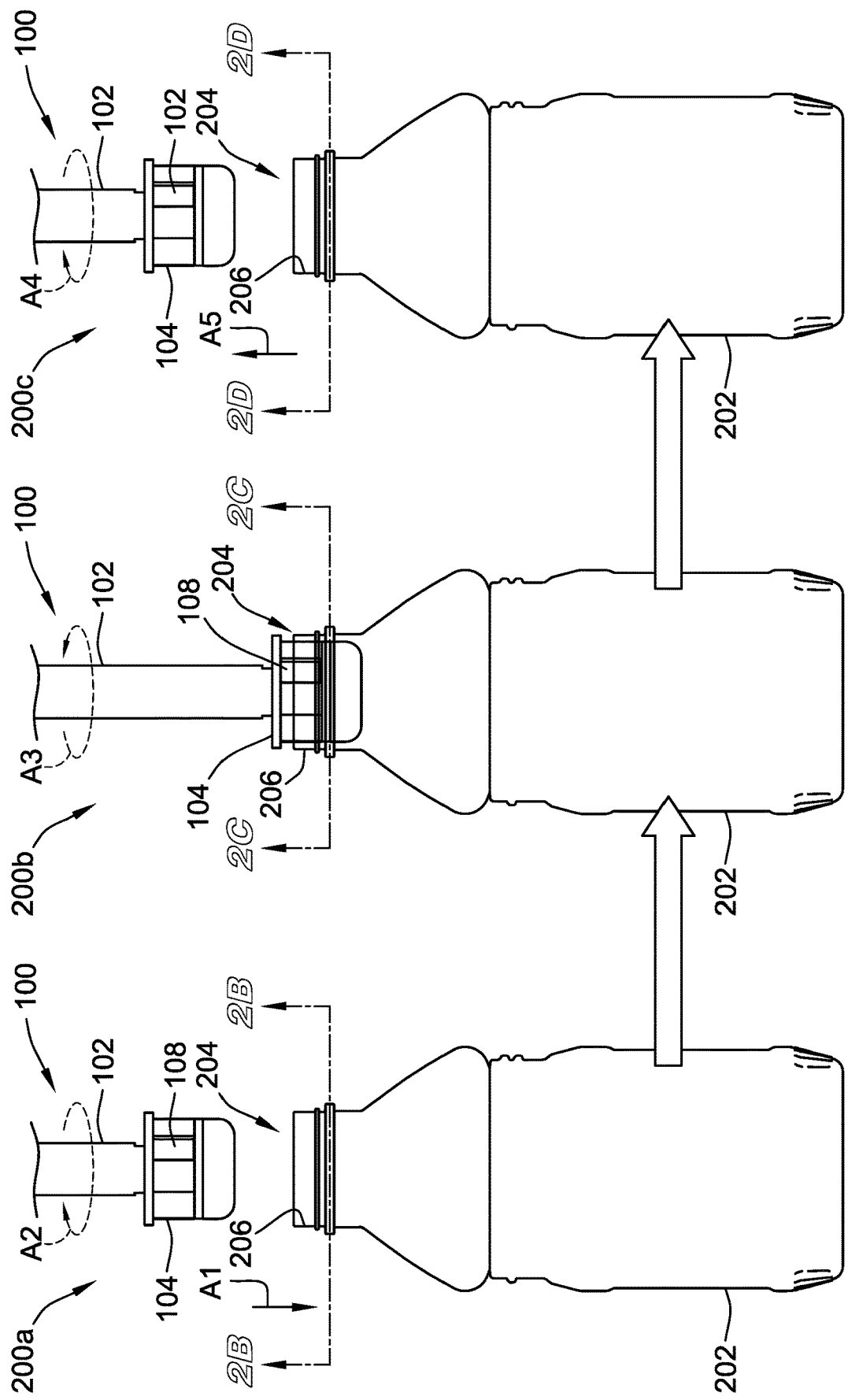
FIG. 2A is a side view of the insertion and withdrawal of a device into a container, for gripping the container, according to an embodiment of the present disclosure.

FIG. 2A illustrates side views of different, non-limiting arrangements 200a-200c between the clutch assembly 100 and a container 202, according to an embodiment of the present disclosure. The illustrated container 202 is a plastic bottle. However, the container 202 can be various other types of containers (e.g., having a different shape, being formed from a different material, etc.) depending, for example, on the intended function of the machine arrangement that includes the clutch assembly 100.

Referring to FIG. 2A, the illustrated beginning arrangement is a loading arrangement 200a. In the loading arrangement 200a, the clutch assembly 100 is initially positioned above the container 202, with the shaft 102 and the clutch 104 of the clutch assembly 100 generally vertically aligned with the opening 204 of the container 202. In the loading arrangement 200a, the clutch assembly 100 translates generally downward according to arrow A1 so that the clutch 104 is at least partially inserted into the opening 204 of the container 202 (see arrangement 200b). As the clutch assembly 100 translates generally downward, the shaft 102 and the clutch 104 rotate in the direction of the arrow A2. Rotation of the clutch 104 in the direction of arrow A2 ensures that the rollers 108 are positioned towards the second ends 112b of the slots 112 so that the rollers 108 do not obstruct insertion of the clutch 104 into the opening 204 of the container 202.

Figure 2B:
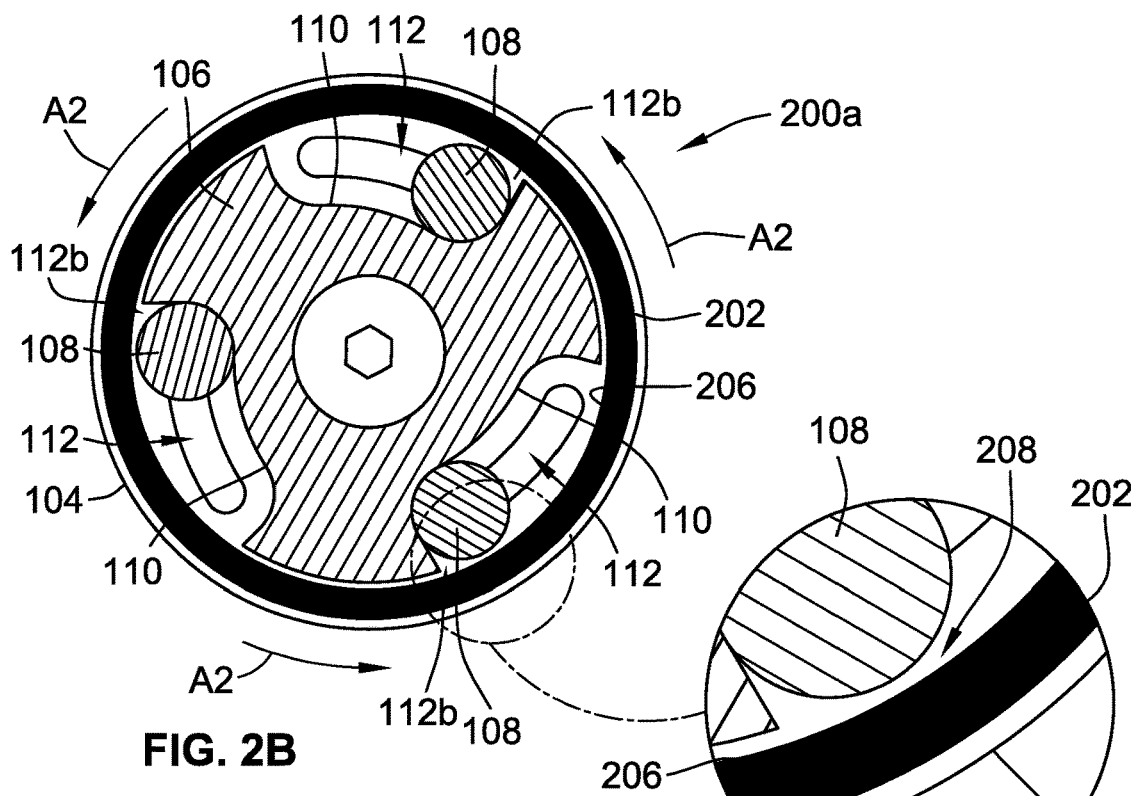
FIG. 2B is a cross-sectional view along the line 2B-2B of FIG. 2A, according to an embodiment of the present disclosure.

FIG. 2B illustrates a projected cross-section of the clutch 104 and the container 202 in the loading arrangement along the line 2B-2B of FIG. 2A. As shown, the rollers 108 are towards the second ends 112b of the slots 112 and retracted relative to the periphery 114. As shown in the enlarged portion, a gap 208 exists between the roller 108 and the inner surface 206 of the container 202. The gap 208 is formed as a result of the rollers 108 being retracted towards the second end 112b of the slots 112 so that the clutch 104 can be inserted into the opening 204 of the container 202.

Referring back to FIG. 2A, the clutch 104 and the container 202 then proceed to the drive arrangement 200b where, after insertion of the clutch 104 into the opening 204 of the container 202, the shaft 102 and the clutch 104 rotate in the direction of arrow A3, generally opposite from the direction of arrow A2. Rotation of the clutch 104 in the direction A3 causes the rollers 108 to slide along the slots 112 and contact the inner surface 206 of the container opening 204. Continued rotation of the clutch 104 causes the rollers 108 to engage the inner surface 206 of the opening 204 and the cam surfaces 110 at a first location within the slots 112. The first location can be at the first end 112a of the slots 112. Alternatively, the first location can be along the slots 112 but not at the first end 112a. Engagement occurs when the rollers 108 become fixed against the inner surface 206. More specifically, engagement occurs when the rollers 108 become fixed against the inner surface 206 and the cam surfaces 110, which causes the clutch 104 to grip the container 202. Upon engagement, the container 202 begins rotating with the clutch 104 and the shaft 102 in the direction of arrow A3.

Figure 2C:
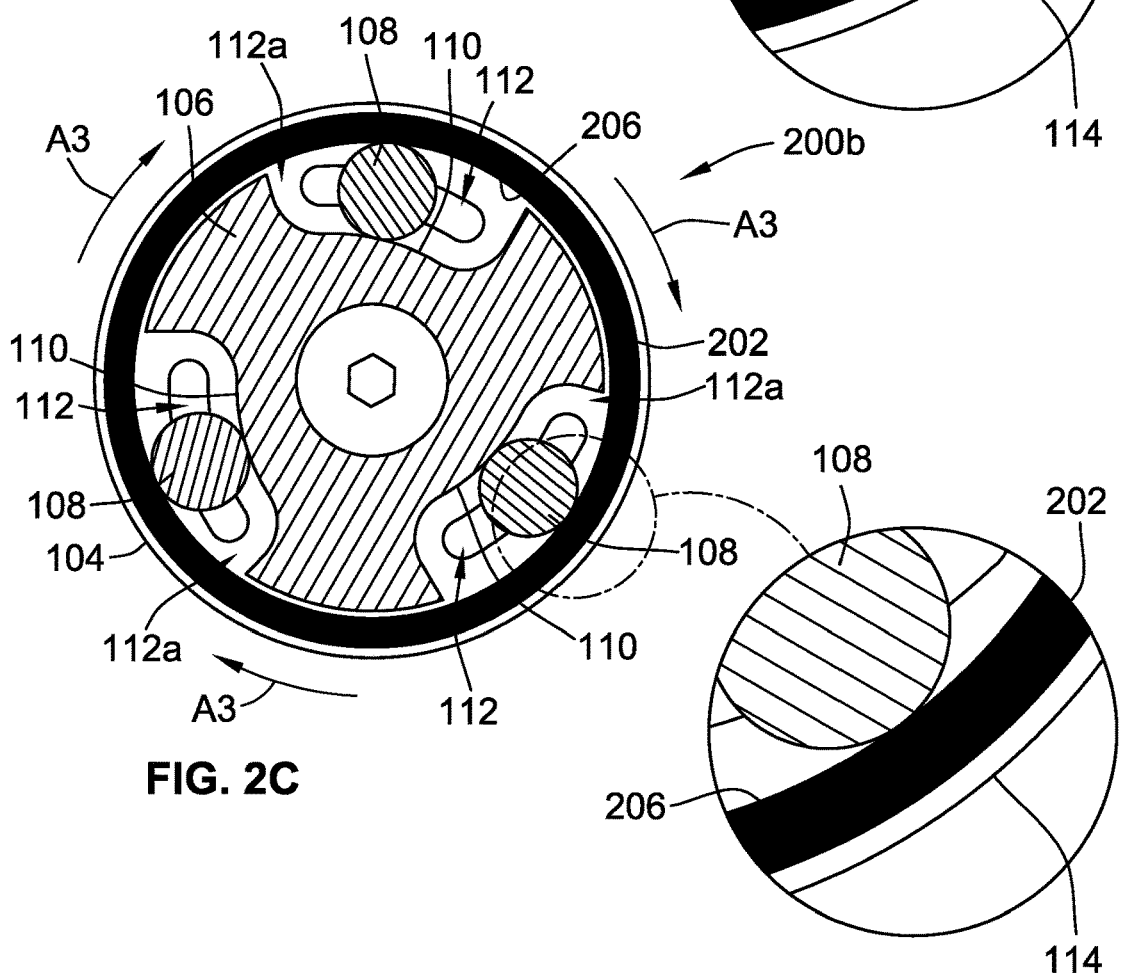
FIG. 2C is a cross-sectional view along the line 2C-2C of FIG. 2A, according to an embodiment of the present disclosure.

FIG. 2C illustrates a cross-section of the clutch 104 and the container 202 in the drive arrangement 200b along the line 2C-2C of FIG. 2A. As shown, the rollers 108 are towards the first ends 112a of the slots 112 and engaged against the inner surface 206 of the opening 204 of the container 202 such that the gap 208 no longer exists.

Referring back to FIG. 2A, when the handling of the container 202 is complete, the drive arrangement 200b transitions to the unloading arrangement 200c for releasing the container 202. To release the container 202, the shaft 102 and the clutch 104 rotate in a generally opposite direction from the arrow A3, as shown by arrow A4 (similar to the direction of arrow A2). The reverse rotation disengages the roller 108 from being engaged against the inner surface 206 of the opening 204 of the container 202. Disengagement of the rollers 108 causes them to lose their grip on the inner surface 206 and release the container 202. The shaft 102 and the clutch 104 can be translated generally upward, as shown by arrow A5, while they rotate to withdraw the clutch 104 from the opening 204. Alternatively, the shaft 102 and the clutch 104 can be translated upward after they have stopped rotating and/or have released the container 202.

Figure 2D:
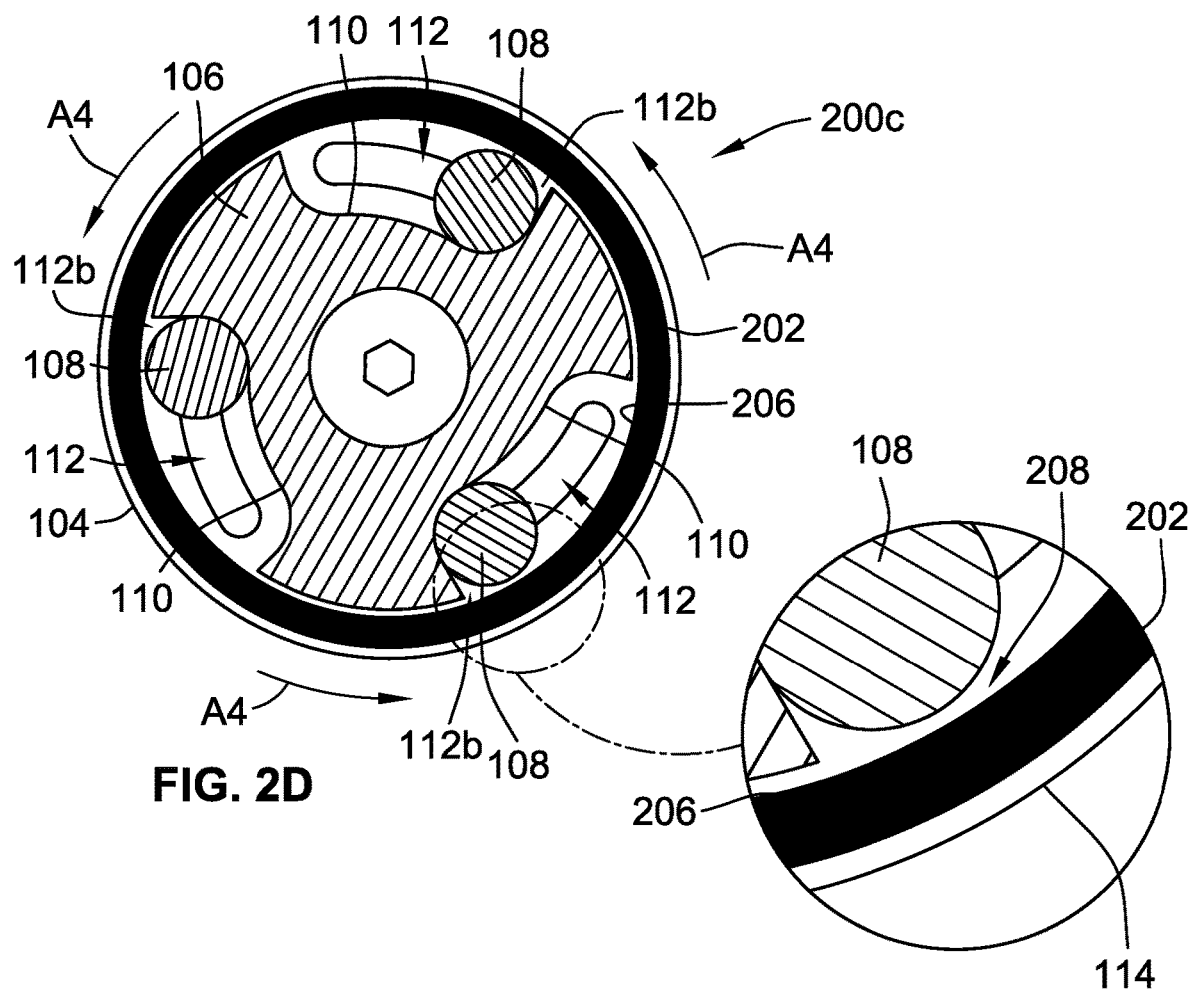
FIG. 2D is a cross-sectional view along the line 2D-2D of FIG. 2A, according to an embodiment of the present disclosure.

FIG. 2D illustrates a projected cross-section of the clutch 104 and the container 202 in the unloading arrangement 200c along the line 2D-2D of FIG. 2A. As shown, the rollers 108 are towards the second ends 112b of the slots 112 and retracted relative to the periphery 114 so as to release the container 202. The gap 208 is again between the roller 108 the inner surface 206 of the opening 204 of the container 202.

Although FIG. 2A illustrates the clutch assembly 100 arranged in a vertical orientation, other orientations are possible. For example, the clutch assembly 100 can be arranged in a horizontal orientation or orientations between horizontal and vertical. The other orientations may be used depending on the arrangement of a container within a machine arrangement that includes the clutch assembly 100.

Although the present disclosure describes the clutch assembly 100 as translating relative to the stationary container 202, the present disclosure contemplates that the container 202 may instead translate relative to the stationary clutch assembly 100. For example, the container 202 may be on or connected to a device (e.g., a pusher device) that can move the container 202 (e.g., raise and lower) relative to the clutch assembly 100, as the clutch assembly 100 remains generally stationary. Moreover, the present disclosure also contemplates that the container 202 and the clutch assembly 100 may both translate towards each other. For example, the container 202 can be connected to a pusher device translates the container 202 relative to the clutch assembly 100, while the clutch assembly 10 also translates towards the container 202.

The mechanics of causing the clutch assembly 100 to translate generally upward and downward and rotate clockwise and counter-clockwise can vary depending on the configuration of the machine arrangement that includes the clutch assembly 100. Various configurations of belts, gears, motors, actuators, hydraulic and pneumatic cylinders, other similar mechanical structures, and any combination thereof, can be used to control the translation and/or rotation of the clutch assembly 100. One exemplary, non-limiting structure for actuating the clutch assembly 100 is shown in FIGS. 3-4E.

Figure 3:
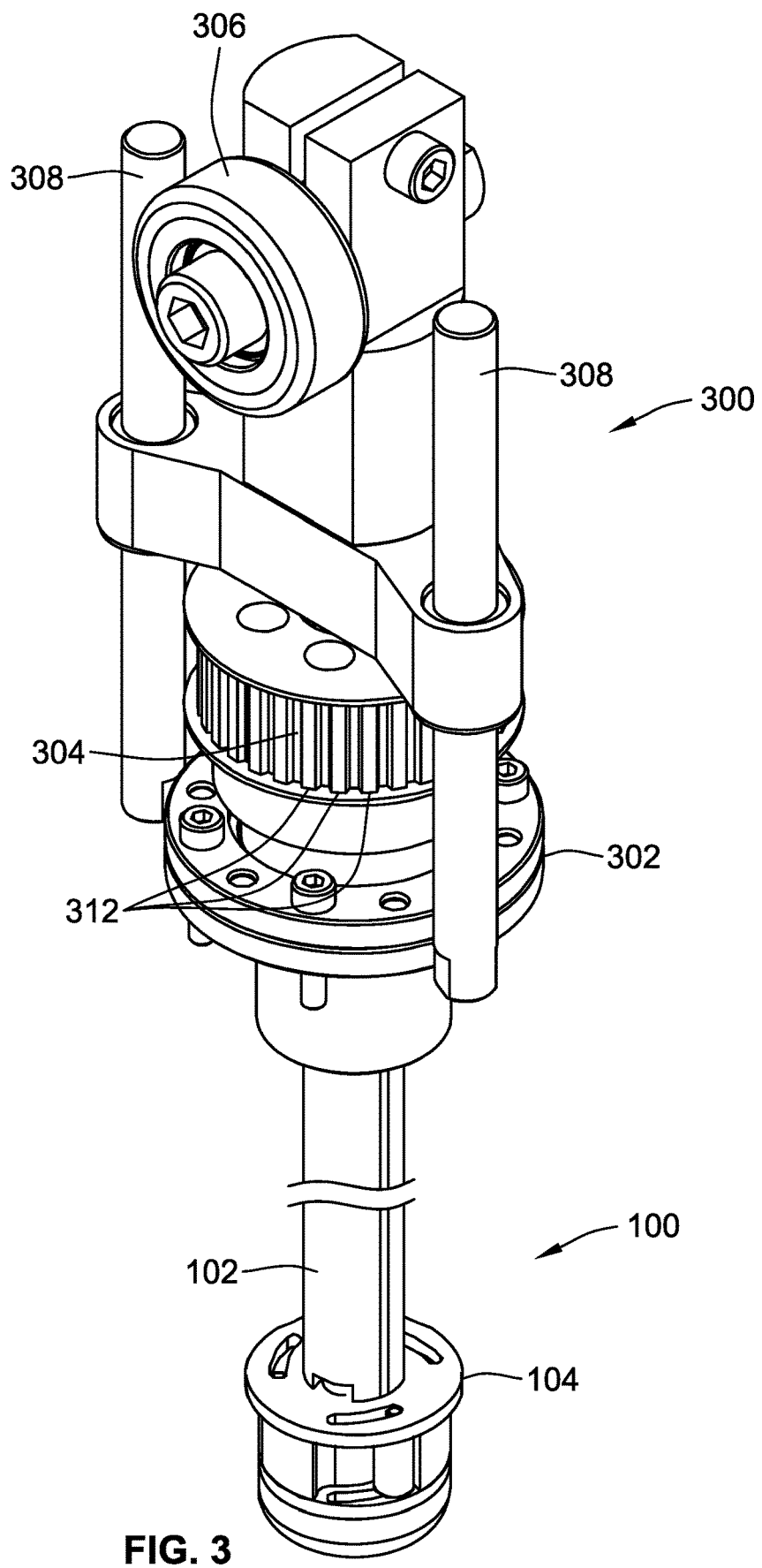
FIG. 3 is a schematic view of a spindle shaft assembly, according to an embodiment of the present disclosure.

FIG. 3 illustrates a spindle shaft assembly 300 that includes the clutch assembly 100, according to an embodiment described herein. The spindle shaft assembly 300 includes elements for actuating the clutch assembly 100 within a machine arrangement (e.g., as discussed with respect to FIGS. 4A-4E below). One such element is a rotary ball spline 302. The rotary ball spline 302 is connected to an end of the shaft 102 opposite from the clutch 104. The rotary ball spline 302 is configured to provide the shaft 102 of the clutch assembly 100 with two degrees of motion. According to a first degree of motion, the rotary ball spline 302 allows the shaft 102 to translate, generally upward and downward. According to a second degree of motion, the rotary ball spline 302 allows the shaft 102 to rotate, generally clockwise and counter-clockwise.

In one or more embodiments, the rotary ball spline 302 is connected to a drive pulley 304. In one or more alternative embodiments, the drive pulley 304 instead can connect directly to the shaft 102. The drive pulley 304 is a drive mechanism (e.g., a first drive mechanism) that is configured to impart a rotation to the clutch assembly 100. The circumference of the drive pulley 304 includes a plurality of splines 312 that can interface with, for example, a belt, a gear, or similar mechanical structure for imparting rotational movement to the drive pulley 304. However, although illustrated as being a plurality of splines, the drive pulley 304 can have other configurations. For example, the drive pulley 304 can be a gear or have some other type of outer surface that can be used to impart rotation to the drive pulley 304.

The drive pulley 304 is one exemplary embodiment of a drive mechanism configured to impart a rotational motion to the clutch assembly 100. Other drive mechanisms configured to impart the rotational motion can be used, such any type of gear, pulley, wheel, motor, any combination thereof, or the like.

The second end 102b (see FIGS. 1A-1B) of the shaft 102 is connected to a translation wheel 306. The translation wheel 306 is an another drive mechanism (e.g., a second drive mechanism) but is instead configured to transfer a translational motion to the shaft 102 and the clutch 104 of the clutch assembly 100. As discussed further below, the translation wheel 306 is configured to override an undulating surface that causes the shaft 102 to rise and fall, thereby imparting the translation.

The translation wheel 306 is one exemplary embodiment of a drive mechanism configured to translate the clutch assembly 100. Other drive mechanisms configured to cause the translational motion can be used, such any type of gear, pulley, wheel, pneumatic or hydraulic cylinder, linear actuator, motor, any combination thereof, or the like.

In one or more embodiments, the spindle shaft assembly 300 further includes anti-rotation rods 308. The anti-rotation rods 308 are configured to connect the spindle shaft assembly 300 to a machine arrangement, as discussed further below. Connection of the anti-rotation rods 308 to a machine arrangement, or an element within a machine arrangement, prevents or inhibits the spindle shaft assembly 300 from moving (e.g., rotating and/or translating) during rotation and translation of the shaft 102 and the clutch 104, as discussed further below. Although a pair of anti-rotation rods 308 are shown, in one or more embodiments, there may be one, three, four, or more anti-rotation rods 308.

In embodiments in which the clutch assembly 100 is configured to remain stationary as a container is brought to the clutch assembly 100, the rotary ball spline 302 and the translation wheel 306 may be omitted from the spindle shaft assembly 300. Instead, the spindle shaft assembly 300 may have a mechanism that is configured to only cause the clutch assembly 100 to rotate according to the second degree of motion. For example, the drive pulley 304 may be directly connected to the shaft 102 without the rotary ball spline 302.

Figure 4A:
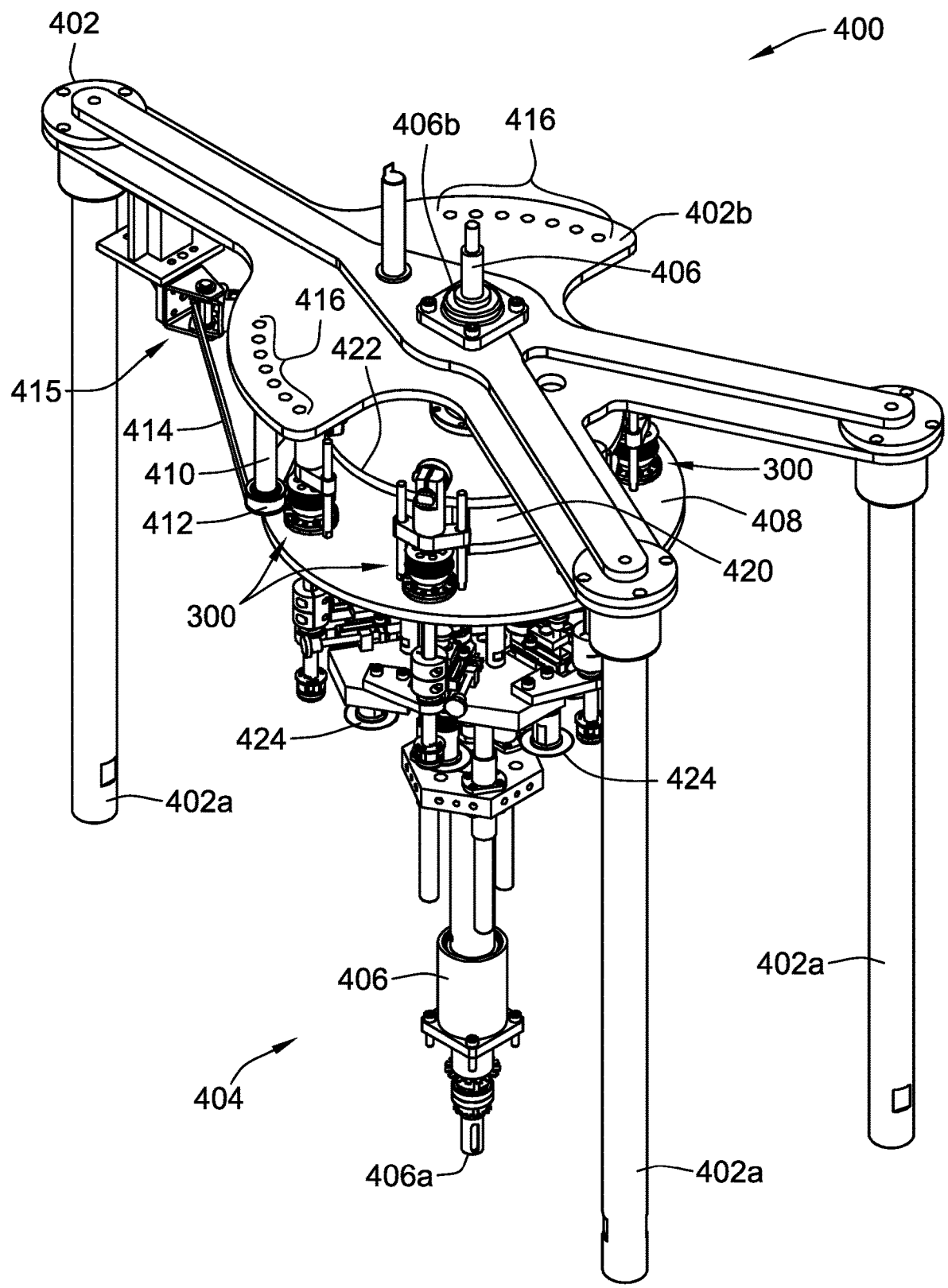
FIG. 4A is a schematic view of a machine arrangement with multiple spindle shaft assemblies for handling containers, according to an embodiment of the present disclosure.
Figure 4B:
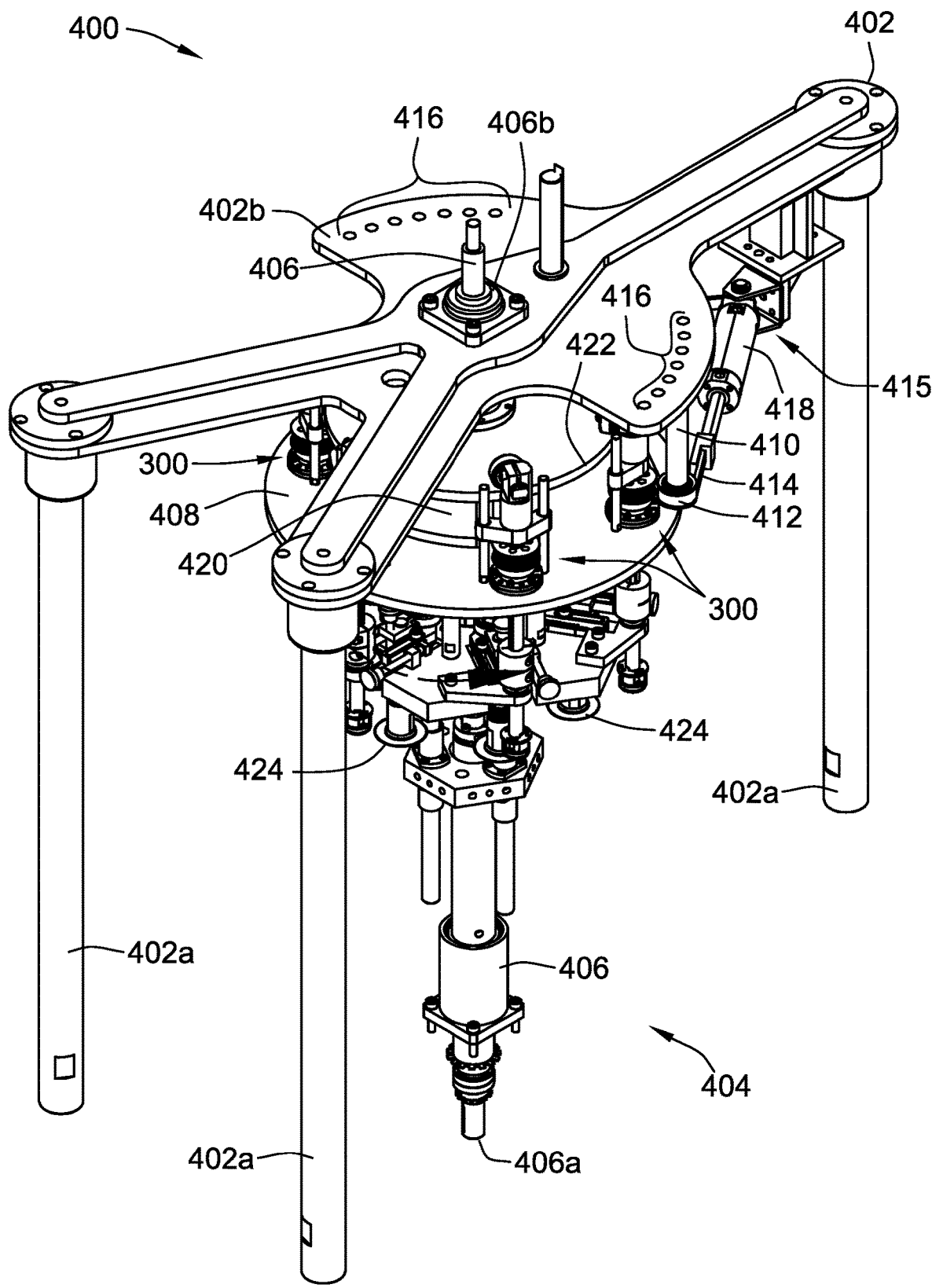
FIG. 4B is another schematic view of the machine arrangement of FIG. 4A, according to an embodiment of the present disclosure.
Figure 4C:
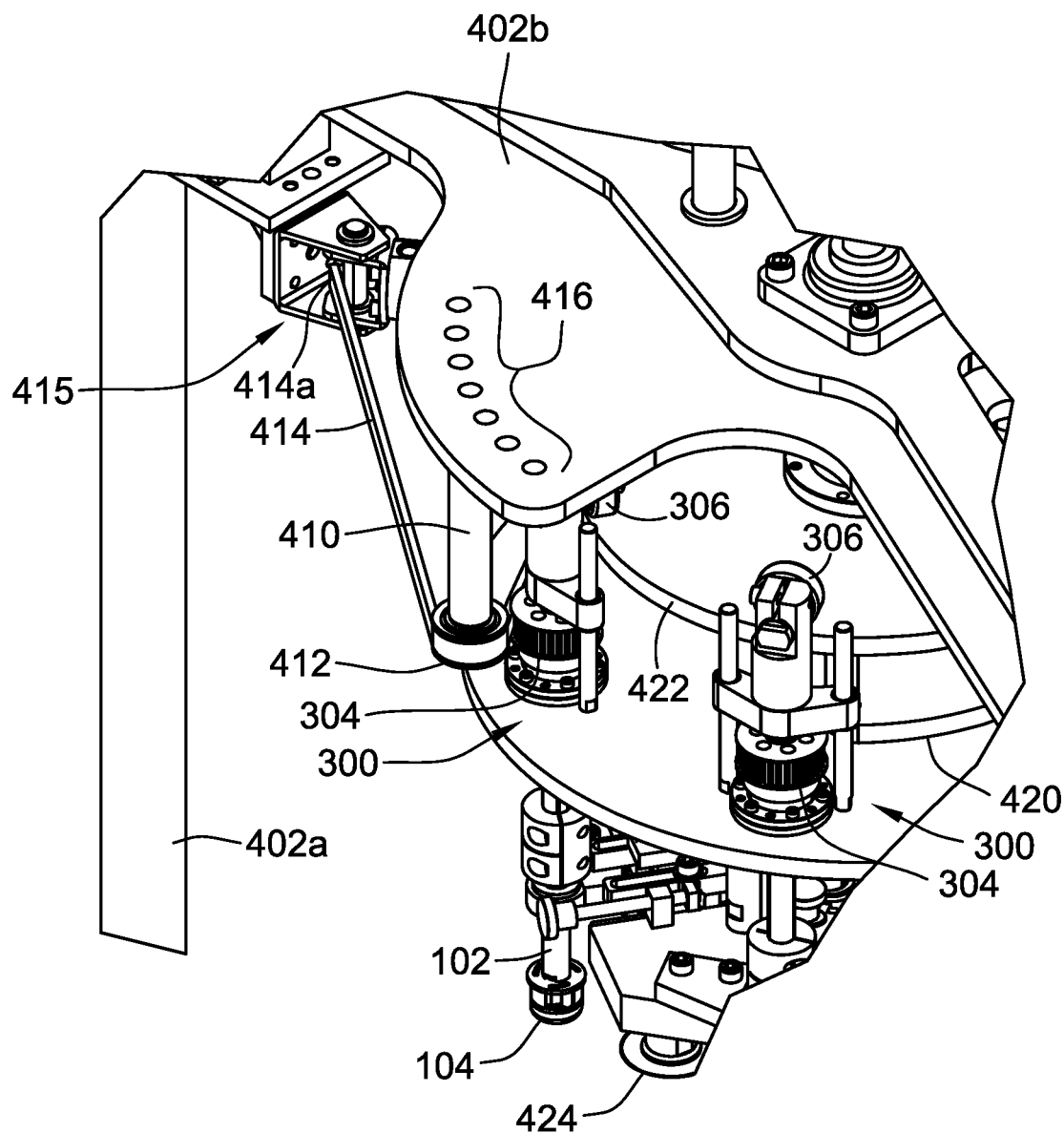
FIG. 4C is a detailed view of a portion of the machine arrangement of FIG. 4A, according to an embodiment of the present disclosure.
Figure 4D:
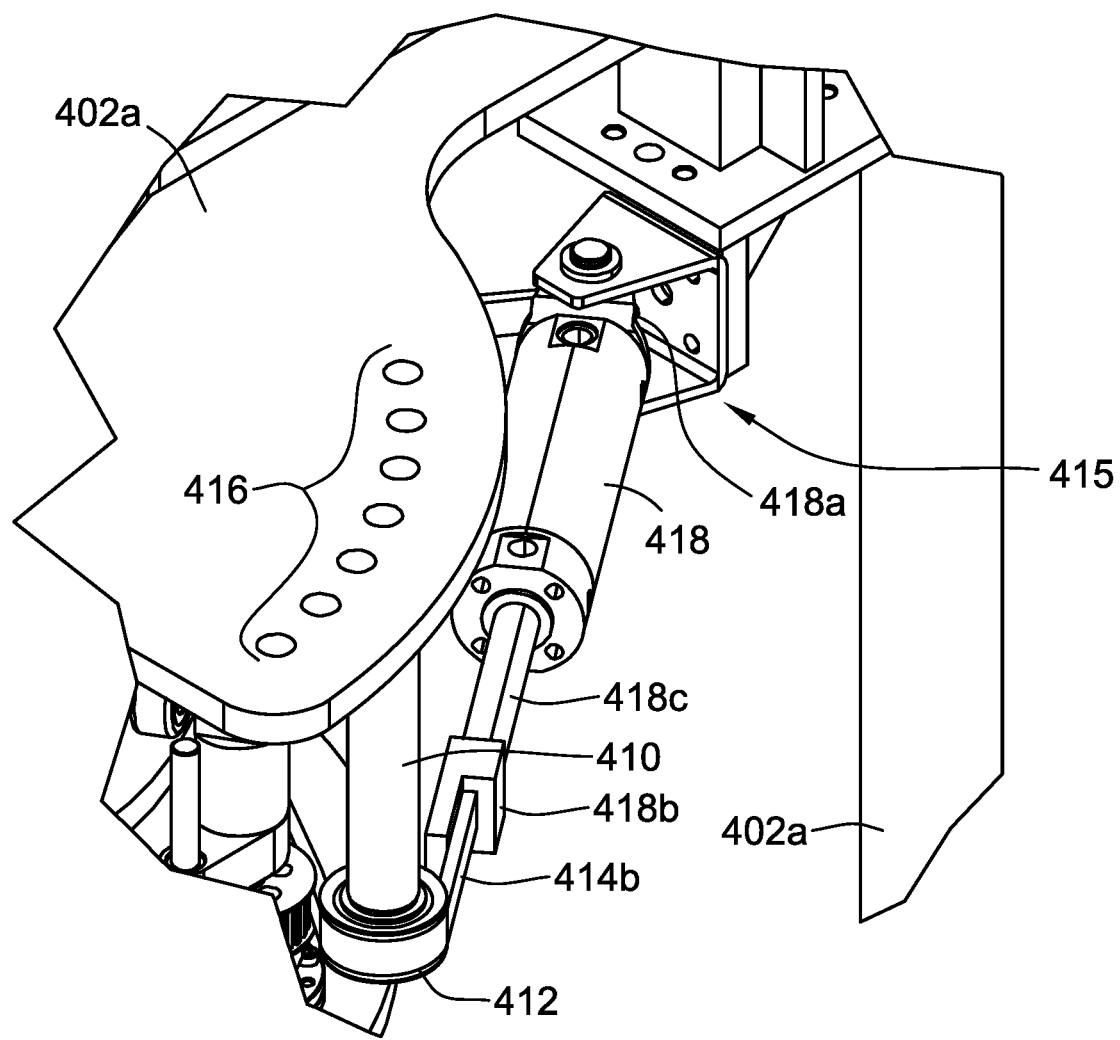
FIG. 4D is a detailed view of another portion of the machine arrangement of FIG. 4A, according to an embodiment of the present disclosure.
Figure 4E:
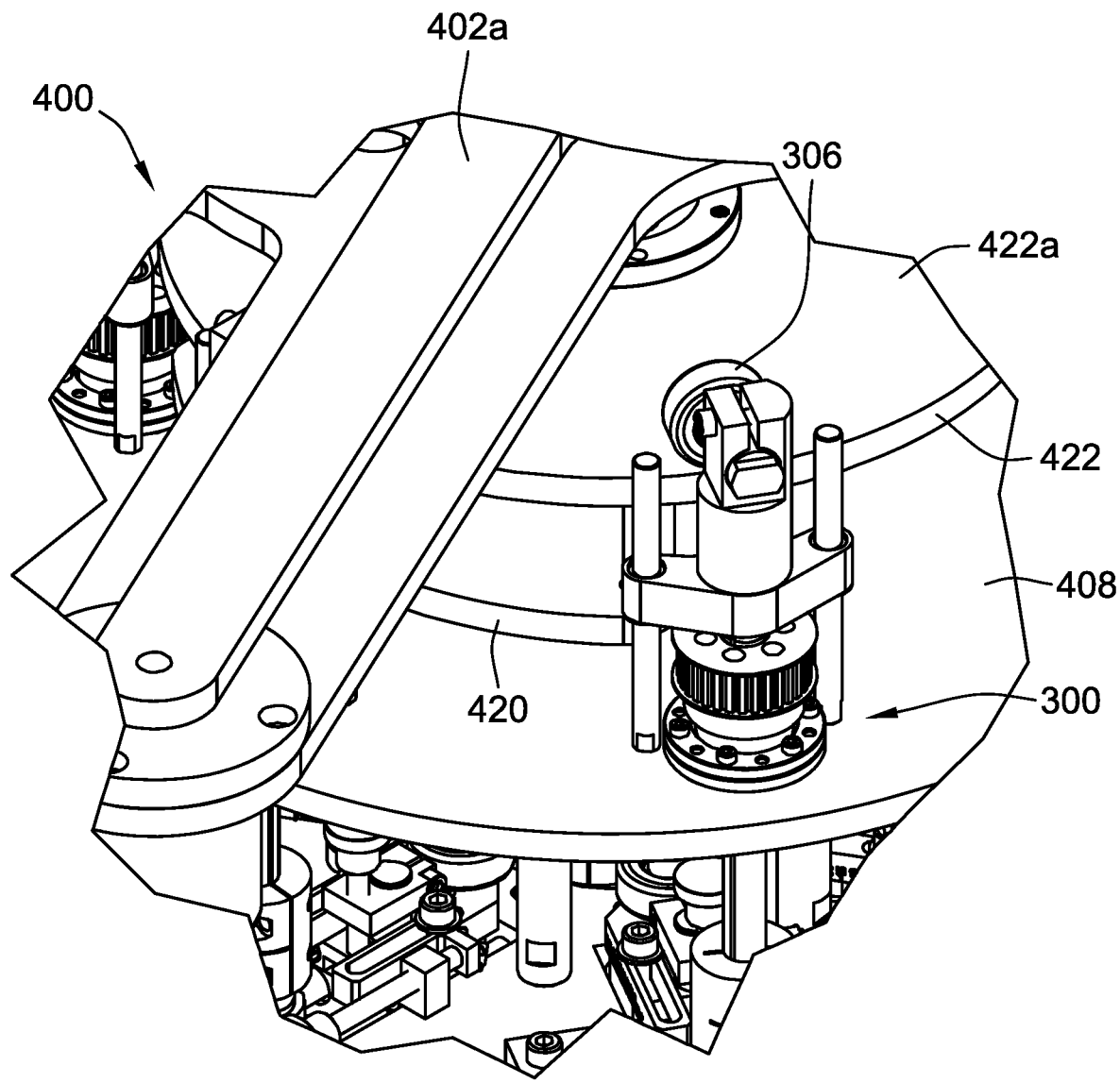
FIG. 4E is a detailed view of another portion of the machine arrangement of FIG. 4A, according to an embodiment of the present disclosure.

FIG. 4A is a schematic view of a machine arrangement 400 with multiple spindle shaft assemblies 300 for handling a container, such as the container 202 of FIG. 2A, according to one embodiment. FIG. 4B is another schematic view of the machine arrangement 400 of FIG. 4A from a different perspective. FIGS. 4C-4E are detailed views of other portions of the machine arrangement 400.

The machine arrangement 400 includes a primary turret 404 supported by a frame 402. In the illustrated embodiment of FIGS. 4A and 4B, the frame 402 includes three legs 402*a* and a frame plate 402*b* that spans between the legs 402*a*. However, it is contemplated that the frame 402 can vary from the frame 402 illustrated in FIGS. 4A and 4B. For example, the frame 402 can be attached to a ceiling or another machine arrangement (such as the machine arrangement that drives the primary turret 404, can have fewer or more legs 402*a*, a combination thereof, or the like).

The primary turret 404 includes a main turret shaft 406. The main turret shaft 406 provides the primary rotational movement of the elements of the machine arrangement 400, as discussed further below. The main turret shaft 406 is configured to connect at the first end 406*a* to a motor, such as a servo motor (not shown), which causes the main turret shaft 406 to rotate. The main turret shaft 406 is configured to connect to the frame plate 402*b* at a second, generally opposite end 406*b*.

The primary turret 404 also includes a support plate 408 that holds multiple spindle shaft assemblies 300. The support plate 408 is connected to and rotates with the main turret shaft 406. The combination of the main turret shaft 406 and the support plate 408 rotates the elements of the machine arrangement 400, such as the spindle shaft assemblies 300. In the illustrated embodiment, the spindle shaft assemblies 300 connect to the support plate 408 at the rotary ball splines 302 so that part of the shaft 102 and the clutch 104 can extend below the support plate 408 and independently rotate and translate relative to the support plate 408. The anti-rotation rods 308 of the spindle shaft assemblies 300 are connected to the support plate 408 to inhibit or prevent the spindle shaft assemblies 300 from rotating and translating relative to the support plate 408, while the shafts 102 and the clutches 104 move.

As illustrated, the support plate 408 includes six spindle shaft assemblies 300, each of which is generally uniformly spaced along the perimeter of the support plate 408. However, the support plate 408 can alternatively be configured to hold more or less than six spindle shaft assemblies 300, such as one, two, three, four, five, seven, eight, and so forth, according to the desired specifications of the machine arrangement 400.

The machine arrangement 400 further includes tension shafts 410 that extend down from the frame plate 402*b*. At ends of the tension shafts 410 are idler pulleys 412. The tension shafts 410 and the idler pulleys 412 support a stationary belt 414 that is wrapped around the idler pulleys 412. The opposing ends of the tension shafts 410 connect to the frame plate 402*b* at respective apertures 416. The apertures 416 determine the positions of the tension shafts 410 and the idler pulleys 412, which, in turn, determines the position of the stationary belt 414 around the circumference of the support plate 408. Accordingly, there may be multiple apertures 416 in the frame plate 402*b* for controlling the positions of the tension shafts 410 and the idler pulleys 412.

As shown in FIG. 4C, the stationary belt 414 can be connected at a first end 414*a* to a joint 415 that extends from the frame plate 402*b*. The stationary belt 414 is a drive mechanism that is configured to come into contact with the drive pulleys 304 of the spindle shaft assemblies 300 as the spindle shaft assemblies 300 orbit about the axis of the main turret shaft 406 within the machine arrangement 400. The contact between the stationary belt 414 and the drive pulleys 304 causes the drive pulleys 304 to rotate, which, in turn, causes the shafts 102 and the clutches 104 to rotate.

As shown in the illustrated embodiments, the stationary belt 414 is positioned about only a portion of the circumference of the support plate 408. Accordingly, the stationary belt 414 causes rotation of the drive pulley 304 only when the respective spindle shaft assembly 300 of the drive pulley 304 is adjacent to the stationary belt 414 as the respective spindle shaft assembly 300 rotates about the main turret shaft 406 with the support plate 408. Thus, having the ability to position the tension shafts 410 and the corresponding idler pulleys 412 at selected ones of the plurality of apertures 416 allows a user to control where along the circumference of the support plate 408 the rotation is imparted on the drive pulleys 304 by the stationary belt 414 (i.e., the stationary belt 414 timing).

As shown in FIGS. 4B and 4D, a second, generally opposite end 414*b* of the stationary belt 414 can be coupled to a tensioner 418. The tensioner 418 can be any device that can extend and contract in length, such as a pneumatic, hydraulic, or mechanical cylinder. A first end 418*a* of the tensioner 418 can be coupled to the joint 415, and a second, opposite end 418*b* of the tensioner 418 can be coupled to the stationary belt 414. The tensioner 418 is configured to adjust the tension of the stationary belt 414, as needed, by extending or retracting the second end 418*b*. The tensioner 418 also can be used to adjust the effective length of the stationary belt 414, as needed, depending on the location of the tension shafts 410. For example, the arm 418*c* of the cylinder can extend or retract depending on the required length of the stationary belt 414 as needed depending on the number and/or position of the spindle shaft assemblies 300 engaging the stationary belt 414. Although not changing the length of the stationary belt 414, the length of the stationary belt 414 that can be used to rotate the drive pulleys 304 increases.

As shown in FIGS. 4A, 4C, and 4E, the machine arrangement 400 includes a reverse rotation plate 420. The reverse rotation plate 420 is coupled to the primary turret 404 but does not rotate with the main turret shaft 406. Instead, the position of the reverse rotation plate 420 is stationary within the machine arrangement 400 relative to the rotating main turret shaft 406 and support plate 408.

Similar to the stationary belt 414, the reverse rotation plate 420 is configured to contact the drive pulleys 304 of the spindle shaft assemblies 300 as the spindle shaft assemblies 300 orbit about the axis of main turret shaft 406. The contact between the reverse rotation plate 420 and the drive pulleys 304 causes the drive pulleys 304 to rotate, which in turn causes the shafts 102 and the clutches 104 to rotate. The length of the reverse rotation plate 420 that contacts the drive pulleys 304 can vary depending on for how long the reverse rotation plate 420 is required to rotate the drive pulleys 304 (i.e., reverse rotation plate 420 timing). The reverse rotation plate 420 timing is determined based on how much time it takes to disengage the rollers 108 from the inner surface 206 of the opening 204 to release the container 202 from the clutch 104 (see FIGS. 2A-2C).

The stationary belt 414 contacts the drive pulleys 304 on the radially outward facing side, with the axis of the main turret shaft 406 as the radial frame of reference. In contrast, the reverse rotation plate 420 contacts the drive pulleys 304 on the radially inward facing side, again with the axis of the main turret shaft 406 as the radial frame of reference. Because the stationary belt 414 contacts the drive pulleys 304 on the opposite side from where the reverse rotation plate 420 contacts the drive pulleys 304, the reverse rotation plate 420 causes the drive pulleys 304 to rotate in an opposite direction as the stationary belt 414. More specifically, the contact between the stationary belt 414 and the drive pulleys 304 causes the drive pulleys 304 to rotate in an opposite direction from the rotation of the main turret shaft 406, and the contact between the reverse rotation plate 420 and the drive pulleys 304 causes the drive pulleys 304 to rotate in the same direction as the main turret shaft 406.

The machine arrangement 400 further includes a translation cam 422. The translation cam 422 is connected to the primary turret 404 but does not rotate with the main turret shaft 406. Instead, the position of the translation cam 422 is stationary within the machine arrangement 400 relative to the rotating main turret shaft 406 and support plate 408.

The translation wheels 306 of the spindle shaft assemblies 300 are configured to contact and travel over the translation cam 422 as the spindle shaft assemblies 300 orbit about the axis of the main turret shaft 406 (see, e.g., FIG. 4C). The translation cam 422 can have an uneven top surface 422*a* that causes the translation wheels 306 to travel generally upward and downward as they travel across the top surface 422*a* of the translation cam 422. Alternatively, the translation cam 422 can have one or more elements (e.g., inclinations, mounds, bumps, ridges, etc.) that the translation wheels 306 ride over. The resulting generally upward and downward motion of the translation wheels 306 causes the clutch assemblies 100 connected to the translation wheels 306 to likewise translate generally upward and downward.

The generally upward and downward motion of the translation wheels 306 can be configured to coincide with the insertion and removal of the clutch 104 in an opening (e.g., opening 204 of FIG. 2A) of a container (e.g., container 202 of FIG. 2B). Accordingly, the positions of the uneven top surface 422*a* or the one or more elements on the translation cam 422 that cause the translation wheels 306 to move generally upward and downward is determined based on the desired location of the generally upward and downward motion of the translation wheels 306 (i.e., translation cam 422 timing). The translation cam 422 timing corresponds to where within the machine arrangement 400 the clutch 104 engages and disengages from containers.

In embodiments in which the clutch assembly 100 is configured to remain stationary as a container is brought to the clutch assembly 100, the translation cam 422 may be omitted from the machine arrangement 400. Instead, either a separate machine arrangement may be configured to bring the container up to the clutch assembly 100, or another component within the machine arrangement 400 may be configured to bring the container up to the clutch assembly 100, or both, rather than the clutch assembly 100 being configured to translate downwardly to the container.

In one or more embodiments, the primary purpose of the machine arrangement 400 can be trimming excess material from the opening of a container. For example, the machine arrangement 400 can be configured to trim excess plastic material off of a blow-molded plastic container. In such embodiments, the machine arrangement 400 includes knives 424 (see FIGS. 4A-4C). In one or more embodiments, the knives 424 can be coupled to the support plate 408 and configured to orbit about the axis of the main turret shaft 406. The knives 424 can also be configured to rotate about their respective axes to assist in cutting the plastic. Alternatively, the knives 424 can be configured to remain rotationally stationary about their respective axes and, instead, cut the plastic based on the rotation of the clutch assemblies 100, as discussed in more detail below. Alternatively, in one or more embodiments, the knives 424 can be within the machine arrangement 400 but not connected to the support plate 408. Instead, for example, the knives 424 can be connected to and extend from one or more of the legs 402*a*-402*c* and contact the plastic containers engaged with the clutch assemblies 100.

The process for trimming excess plastic from the plastic containers (or any material from a respective container, such as metal) begins with a container being placed in a designated position within the machine arrangement 400. After the container is placed at a location within the machine arrangement 400 that corresponds to the loading arrangement 200*a* of FIG. 2A, a spindle shaft assembly 300 is brought over the container (or is already over the container) so that the shaft 102 and the clutch 104 generally align with the opening of the container. At the same time, or subsequently thereafter, the shaft 102 and the clutch 104 translate generally downward so that the clutch 104 is at least partially inserted into the opening of the container. The translation occurs by the translation wheel 306 moving off of a bump or other element of the translation cam 422 so that the translation wheel 306 translates generally downward.

Once the clutch 104 is at least partially within the opening of the container, the shaft 102 and the clutch 104 rotate by virtue of the drive pulley 304 of the spindle shaft assembly 300 coming into contact with the stationary belt 314. The rotation of the clutch 104 causes the rollers 108 to engage against the inner surface of the opening of the container and the cam surfaces 110. Engagement of the clutch 104 with the container causes the container to rotate in a first direction. One or more of the knives 424 may then contact the container to trim excess plastic from the opening. As discussed above, the knives 424 can be configured to rotate about their axes, or the knives can be stationary about their axes and the rotation of the container can assist in the knives 424 cutting the plastic.

Rotation of the container is maintained while the drive pulley 304 is in contact with the stationary belt 414 and as the spindle shaft assembly 300 orbits about the axis of the main turret shaft 406. Once the spindle shaft assembly 300 moves beyond the stationary belt 314, the drive pulley 304 stops rotating. Thereafter, the drive pulley 304 contacts the reverse rotation plate 420.

The reverse rotation plate 420 causes the shaft 102 and the clutch 104 to rotate in a second direction, opposite the first direction. As discussed above, rotation in the second direction disengages the rollers 108 from the inner surface of the opening of the container, which disengages the container from the clutch 104. At the same time, or thereafter, the translation wheel 306 contacts an inclination, bump, or other element on the translation cam 422, which causes the translation wheel 306 to translate generally upward. Accordingly, the shaft 102 and the clutch 104 also translate generally upward with the translation wheel 306 such that the clutch 104 is withdrawn from the opening of the container. The container can then be removed. The translation wheel 306 can subsequently translate back in a downward direction when the spindle shaft assembly 300 is over a new container to be trimmed, and the process may then repeat.

Although the spindle shaft assemblies 300 are disclosed as being rotated clockwise once and rotated counterclockwise once during a single rotation of the support plate 408, it is contemplated that the spindle shaft assemblies 300 can rotate clockwise and/or counterclockwise more than once for each rotation of the support plate 408. For example, the spindle shaft assemblies 300 can be rotated clockwise and counterclockwise twice or more per rotation of the support plate 408. Such an embodiment may be associated with each spindle shaft assembly 300 mating with two containers for each rotation of the support plate 408. For such an embodiment, the machine arrangement 400 can include, for example, a separate stationary belt 414, a separate reverse rotation plate 420, or both to cause the multiple clockwise and counterclockwise rotations. Alternatively, each discrete rotation of the spindle shaft assembly 300 can include different portions of the same stationary belt 414, reverse rotation plate 420, or both. The spindle shaft assemblies 300 can come into contact with the different portions of the same stationary belt 414, reverse rotation plate 420, or both when the rotation is desired.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," "attached," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the machine module and/or machine arrangement as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes, and/or omissions may also be made in the design, operating conditions, and arrangement of the various exemplary embodiments without departing from the scope of the present invention.

The invention claimed is:

1. A clutch assembly for handling a container having an opening, the clutch assembly comprising:
   a shaft configured to rotate in a first direction and a second direction, opposite from the first direction; and
   a clutch at a first end of the shaft configured to at least partially fit within the opening of the container, the clutch including:
   a cam having at least two cam surfaces; and
   at least two rollers, each roller of the at least two rollers being configured to engage against an inner surface of the opening of the container and a respective cam surface of the at least two cam surfaces when the shaft rotates in the first direction, and disengage from against the inner surface of the opening of the container and the respective cam surface when the shaft rotates in the second direction.

2. The clutch assembly of claim 1, wherein the at least two rollers include three rollers generally uniformly spaced around the clutch.

3. The clutch assembly of claim 1, wherein the clutch includes at least two pairs of slots, and each roller of the at least two rollers is configured to sit within and between at least one pair of slots of the at least two pairs of slots.

4. The clutch assembly of claim 3, wherein each pair of slots of the at least two pairs of slots is arranged such that a first end of each slot is closer to a periphery of the clutch than a second end of each slot.

5. The clutch assembly of claim 4, wherein the at least two cam surfaces are arranged such that a first end of each cam surface is closer to a periphery of the clutch than a second end of each cam surface.

6. The clutch assembly of claim 1, wherein the clutch includes two slots and the at least two rollers are configured to sit within and between the two slots.

7. The clutch assembly of claim 1, wherein the at least two cam surfaces are arranged such that a first end of each cam surface is closer to a periphery of the clutch than a second end of each cam surface.

8. A spindle shaft assembly for handling a container, the spindle shaft assembly comprising:
   a rotary ball spline;
   a clutch assembly according to claim 1 connected to the rotary ball spline;
   a first drive mechanism configured to translate the clutch assembly; and
   a second drive mechanism configured to rotate the clutch assembly.

9. The spindle shaft assembly of claim 8, wherein the first drive mechanism is a translation wheel coupled to the shaft.

10. The spindle shaft assembly of claim 8, wherein the second drive mechanism is a drive pulley coupled to the rotary ball spline.

11. The spindle shaft assembly of claim 8, further comprising a pair of anti-rotation rods coupled to the rotary ball spline.

12. A machine arrangement comprising:
a support plate configured to rotate, the support plate including at least one spindle shaft assembly coupled thereto, the at last one spindle shaft assembly being configured to handle a container and including:
   a rotary ball spline;
   a clutch assembly according to claim 1 connected to the rotary ball spline and configured to translate and rotate;
   a first drive mechanism configured to impart translational motion to the clutch assembly; and
   a second drive mechanism configured to impart rotational motion to the clutch assembly;
a reverse rotation plate configured to contact the second drive mechanism to impart the rotational motion to the second drive mechanism in a first direction; and
a stationary belt configured to contact the second drive mechanism to impart the rotational motion to the second drive mechanism in a second direction, opposite from the first direction.

13. The machine arrangement of claim 12, further comprising:
   a translation cam having an uneven top surface that generates the translational motion by the first drive mechanism.

14. The machine arrangement of claim 13, wherein the first drive mechanism is a translation wheel coupled to the clutch assembly that is configured to travel over one or more elements of the translation cam to generate the translational motion.

15. The machine arrangement of claim 12, further comprising:
   a main turret shaft configured to rotate the support plate within the machine arrangement,
   wherein rotation of the main turret shaft causes the second drive mechanism of each spindle shaft assembly to contact the reverse rotation plate and the stationary belt to impart the rotational motion in the first direction and the second direction, respectively.

16. The machine arrangement of claim 12, wherein the second drive mechanism is a drive pulley coupled to the rotary ball spline.

17. The machine arrangement of claim 16, wherein the shaft of the clutch is configured to translate and rotate based on the rotary ball spline.

* * * * *